April 2, 1929.  G. McDOWELL  1,707,679
INTERNAL COMBUSTION ENGINE
Original Filed Dec. 18, 1925

INVENTOR.
George McDowell
BY
ATTORNEY.

Patented Apr. 2, 1929.

1,707,679

UNITED STATES PATENT OFFICE.

GEORGE McDOWELL, OF FRANKLIN SQUARE, NEW YORK, ASSIGNOR OF ONE-HALF TO FRED GROZINGER, OF BROOKLYN, NEW YORK.

INTERNAL-COMBUSTION ENGINE.

Application filed December 18, 1925, Serial No. 76,306. Renewed September 17, 1928.

This invention relates to internal combustion engines and includes certain refinements in the construction and arragement of the parts of such engines, whereby repairs are easily and quickly made, the parts are readily assembled and inspected and engines constructed according to this invention do not require to be taken out of service for lengthy periods to make extensive repairs. More particularly the invention includes a novel construction in the cylinders comprising detachable sleeves.

These and other objects of the invention are more specifically described in the following specification and illustrated in the accompanying drawings, in which.

Figures 1, 2, 3:
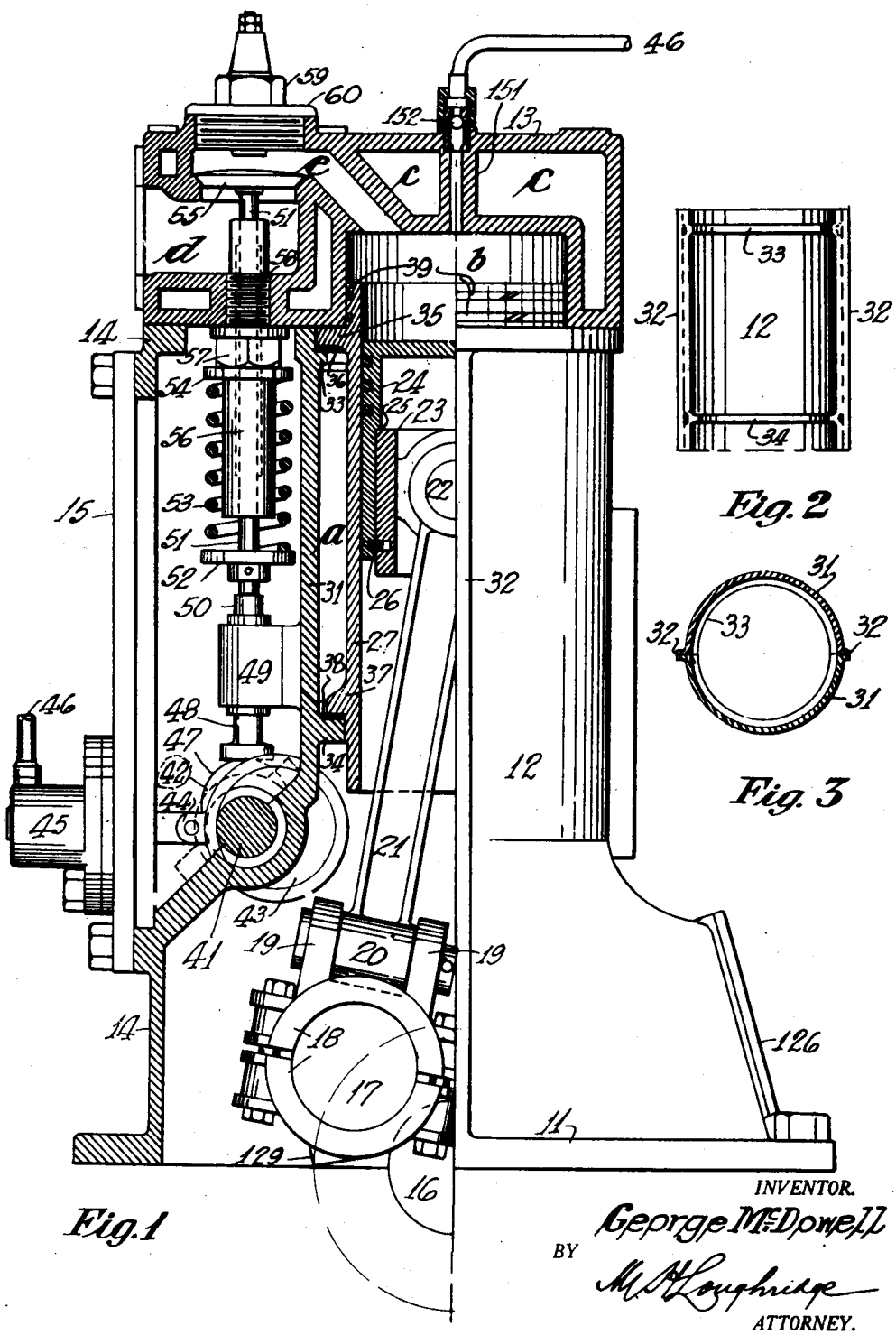
Fig. 1 is an elevation of an engine constructed according to my invention with the cylinder walls shown in half section and the valve head sectioned.
Fig. 2 is a view on a reduced scale of a cylinder wall arranged to be drawn or pressed from sheet stock.
Fig. 3 is a cross section of a cylinder constructed from sheet stock as in Fig. 2.

The construction of the engine proper is shown in Fig. 1. The bottom section of the cylinder 14 is flanged at 11 where it is bolted to the base of the engine not shown. The outer wall of the cylinder is indicated at 12 and the head with the valve mechanism is indicated generally by 13. A cover 15 bolted to the frame 14 protects the valve mechanism. The engine shaft is indicated at 16, the crank pin at 17 and the crank bearing at 18. The crank bearing has lugs developed at 19 to which the connecting rod 21 is pivoted at 20. The connecting rod connects by the wrist pin 22 to the aluminum sleeve 23 of the piston 24. The latter is preferably made from cast iron and is grooved as shown and shouldered at 25 to receive the sleeve 23 and impart the thrust of the piston thereto. The sleeve 23 and the piston 24 are locked in operative relation by the ring 26 engaging a registered groove between them. This ring can be compressed into the space in the groove in 23 so as to clear the piston 24 when the parts are to be assembled or taken apart. For this purpose the ring 26 is accessible through perforations in the wall of 24.

In the construction described, it will be noted that the pivotal connections at each end of the connecting rod are placed at right angles to each other and thus the piston is connected with the crank pin by a universal joint. This reduces the wear on the wrist pin, relieves the piston and the crank shaft of all strain and enables the connecting rod to be disconnected at 20 from the bearing of the wrist pin so that the tightness of this bearing can be easily tested and adjusted. This construction also simplifies the manufacture of the connecting rod.

The inner sleeve or cylinder 37 is preferably made of cast iron and to obtain the advantage of lightness in the piston parts and at the same time secure a cast iron piston working in a cast iron cylinder, the piston is made with the aluminum sleeve as described having the wrist pin connected with the sleeve and the lower section of the piston placed over this sleeve. These parts are readily taken apart so that the piston or the sleeve may be replaced as either part wears.

The cylinder proper is constructed of two parts, comprising the inner sleeve 27 and the outer shell 31. These parts enclose the space $a$ which is connected with the water system forming the water jacket of the cylinder. The outer shell is provided with a flange or ledge 33 at the top and a more extensive annular flange or ledge 34 at the bottom. The shell develops into the frame 14 and is formed to receive the bearing of cam shaft 41 as shown. While the construction shown is adapted to be cast, this invention contemplates a cylinder shell that may be drawn or punched from flat stock—a construction that is made possible by the use of the inner sleeve 27 which is a separate detachable part. In the latter case the shell is preferably made in two parts as indicated in Figs. 2 and 3 under a punch press with the ledges 33 and 34 formed therein and a base corresponding to 14 developed in the press. These parts are formed semi-cylindrical making an easy press operation and are provided with matching ridges 32 on their engaging edges which are welded or otherwise secured together to form a watertight joint for the water jacket.

The inner sleeve 27 is formed with an exterior flange 35 which engages the annular ledge 33 and with a lower flange at 37 which engages the annular ledge 34. A gasket 36 of cork or other material is placed between the engaged faces of 35 and 33 and a similar gasket 38 is placed between 37 and 34. These parts are clamped tightly together by the bolts which tightens the head 13 on the engine, this head engaging the flange 35 as shown. This construction makes the chamber $a$ watertight and at the same time enables the inner sleeve to be removed at any time simply by removing the cover 13 and raising the sleeve upwards. In this operation it will be noted that the annular ledge 37 is smaller in diameter than the ledge 33 so that the cylinder will pass out of the shell. A seal is provided between the top of the sleeve 27 and the cylinder head 13 through the piston rings 39 so that there is no escape of gases during the working stroke of the cylinder. A great convenience arises from this construction as a cylinder sleeve may be replaced on the road simply by removing the cylinder head and replacing the sleeve with a new sleeve which occupies but a comparatively short time and the sleeve of each cylinder may be handled as independent units. It will be observed that when a cylinder sleeve is replaced, if it is not absolutely in alignment, the universal construction in the connecting rod will compensate for such irregularities without impairing the working of the engine.

The cam shaft 41 is provided with a bearing as indicated by 42 in dotted outline for each cylinder of a block or group so that this shaft cannot vibrate. One function of this shaft is to operate the fuel pump 45 through the connection 44 and the eccentric 43. A fuel pump is provided for each cylinder secured to the cover plate 15 as shown in Fig. 4 and delivers fuel oil from the feed pipe 75, connection 74 and through the pipe 46 to the cylinder when the engine is running on this kind of fuel. For a four cycle engine the cam shaft 41 is driven by the usual two to one gear from the engine shaft and delivers the fuel oil at the proper time for the working stroke of the cylinder.

The intake poppet valve 55 is operated by the cam 47 on shaft 41 engaging the plunger 48 moving in the guide 49 and having a head 50 engaging the stem 51 of the valve 55. The valve is held on its seat by the coil spring 53 compressed between the stationary flange 54 and the flange 52 secured to the valve stem 51. The stem 51 is guided by a unitary guide member 56 which has a hexagon section at 57 and a stem 58 threaded into the engine head 13; the stem 51 slides in this guide which can be unscrewed and replaced as a single piece.

Attention is here directed to the fact that the engine head 13 may be entirely removed from the cylinder block together with the valve and the guide 56 and replaced again as a single unitary part, and when assembling, these parts can be set up and assembled as a unitary construction.

A hollow bonnet screw 60 is provided in 13 over the valve head and by means of which the valve head may be removed or repaired. In this screw the spark plug 59 is placed in the intake passage between the chamber $d$ leading to the carburetter and the chamber $e$ leading to the cylinder $b$. The passage $e$ it will be noted is deflected towards the center of the cylinder by a sloping passage which delivers the explosive mixture where it is most effective on the piston. The engine head is water jacketed by the chamber $c$ as indicated according to construction well understood in engines of this type.

The fuel pump 45 is connected with the cylinder by pipe 46 through the orifice 151 in the cylinder head which is closed to reverse circulation by the ball valve 152.

Certain novel features of the engine described are the subject of co-pending applications, Serial Nos. 132,595, 132,596 and 132,597, filed April 30, 1926.

Having thus described my invention, I claim:

1. In an internal combustion engine, the combination of a cylinder having a working piston therein operatively connected with a crank, said cylinder comprising a shell and a detachable inner sleeve in which said piston works, said sleeve formed with a plurality of exterior flanges intermediate its ends engaging corresponding interior flanges in said shell.

2. In an internal combustion engine, the combination of a cylinder having a working piston therein operatively connected with a crank, said cylinder comprising a shell and a detachable inner sleeve in which said piston works, said sleeve formed with an exterior flange spaced from the top and an exterior flange spaced from the bottom and arranged to engage corresponding interior flanges on said shell and inclosing a space between said sleeve and said shell for a water jacket.

3. In an internal combustion engine, the combination of a cylinder having a working piston therein operatively connected with a crank, said cylinder comprising a shell and a detachable inner sleeve in which said piston works, said sleeve formed with an exterior flange at the top and an exterior flange at the bottom of smaller diameter than said top flange and said shell formed with a flange at the top and with a flange at the bottom of smaller diameter than said top flange, the flanges of said sleeve being arranged to engage the flanges of said shell whereby said sleeve is supported in position and may be withdrawn from said shell.

4. In an internal combustion engine, the combination of a cylinder having a working piston therein operatively connected with a crank, said cylinder comprising a shell and a detachable inner sleeve in which said piston works, an exterior flange at the top and bottom of said sleeve arranged to engage corresponding interior flanges in said shell whereby said sleeve is supported in position, the bottom flange of said sleeve being of smaller diameter than the top flange of said shell to enable said sleeve to be withdrawn from said shell.

5. In an internal combustion engine, the combination of a cylinder having a piston working therein operatively connected with a crank, said cylinder comprising a shell and a detachable inner sleeve in which said piston works, said sleeve comprising a unitary casting and said shell comprising a pair of semi-cylindrical members welded on their adjoining faces and means operatively supporting said sleeve by said shell and enclosing a space for a water jacket between said sleeve and said shell.

6. In an internal combustion engine, the combination of a shell and a cylinder having a piston working therein operatively connected with a crank, said cylinder comprising a detachable inner sleeve in which said piston works, said sleeve being of smaller diameter than said shell and formed with an exterior flange engaging said shell and an end projecting beyond said flange, and a valve head for said cylinder, the projecting end of said sleeve being arranged to enter said valve head.

7. In an internal combustion engine, the combination of a cylinder having a piston working therein operatively connected with a crank, said cylinder comprising a detachable inner sleeve in which said piston works, a hollow valve head for said cylinder arranged to fit over the end of said sleeve and piston rings on the end of said sleeve where it fits within the valve head.

8. In an internal combustion engine, the combination of a cylinder comprising a shell, a sleeve with a piston working therein, an external flange on said sleeve and a projecting end, a hollow head for said cylinder fitting over the projecting end of said sleeve and piston rings on said projecting end where it enters said head.

9. In an internal combustion engine, the combination of a cylinder having a piston therein operatively connected with a crank, said cylinder comprising a shell and a detachable inner sleeve in which said piston works, said shell being of larger diameter than said sleeve and exterior flanges on said sleeve forming with said shell a spacer for a water jacket for said sleeve.

10. In an internal combustion engine, the combination of a shell and a cylinder having a piston working therein operatively connected with a crank, said cylinder comprising a sleeve in which said piston works, said sleeve formed with exterior flanges at both ends seating on said shell, gaskets on said seats and a head on said engine securing said sleeve on said gaskets.

11. In an internal combustion engine, the combination of a cylinder having a working piston therein operatively connected with a crank, said cylinder comprising a shell and a detachable inner sleeve in which said piston works, said sleeve having an exterior flange at one end and an exterior flange at the other end falling within the axial plane of the first mentioned flange, and matching flanges formed in said shell for engaging the exterior flanges of said sleeve.

12. In an internal combustion engine, the combination of a cylinder comprising a shell, a head and a detachable sleeve in which a piston works, said sleeve having exterior flanges intermediate its ends seating in said shell and one projecting end entering said head and the other projecting end entering a guide in said shell.

13. In an internal combustion engine, the combination of a cylinder comprising a shell, a head and a detachable sleeve in which a piston works, said sleeve having exterior flanges intermediate its ends seating in said shell and means in said head and in said shell for holding said sleeve in vertical alignment.

14. In an internal combustion engine, the combination of a cylinder comprising a shell and a detachable sleeve in which a piston works, said sleeve having an exterior annular flange projecting at right angles adjacent its lower end engaging a corresponding internal flange in said shell and means for holding said sleeve in vertical alignment relative to said shell.

15. In an internal combustion engine, the combination of a cylinder comprising a shell, a sleeve with a piston working therein and having an external flange adjacent one end, and a hollow head for said cylinder engaging said flange to hold said sleeve in place, and the end of said sleeve above said flange projecting into said hollow head with a snug fit.

16. In an internal combustion engine, the combination of a cylinder comprising a shell with a detachable inner sleeve having a piston working therein, said shell being of larger diameter than said sleeve and provided with internal flanges and said sleeve being provided with external flanges adjacent its ends engaging in overlapping relation said internal flanges and forming therewith an annular water jacket for said sleeve.

Signed at New York in the county of New York and State of New York this 24th day of November A. D. 1925.

GEORGE McDOWELL.